(12) United States Patent
Oguchi et al.

(10) Patent No.: US 9,056,578 B2
(45) Date of Patent: Jun. 16, 2015

(54) LAMP FOR VEHICLE

(71) Applicant: HONDA MOTOR CO., LTD, Tokyo (JP)

(72) Inventors: Tsuyoshi Oguchi, Wako (JP); Yoshihisa Hirose, Wako (JP); Yosuke Tsuchiya, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 149 days.

(21) Appl. No.: 13/852,658

(22) Filed: Mar. 28, 2013

(65) Prior Publication Data

US 2013/0286674 A1 Oct. 31, 2013

(30) Foreign Application Priority Data

Mar. 30, 2012 (JP) ................................ 2012-081902

(51) Int. Cl.
*B60Q 1/00* (2006.01)
*F21S 8/10* (2006.01)
*F21V 7/00* (2006.01)
*F21V 17/00* (2006.01)
*F21V 17/02* (2006.01)
*B62J 6/04* (2006.01)

(52) U.S. Cl.
CPC ........... *B60Q 1/0041* (2013.01); *F21S 48/1109* (2013.01); *F21V 7/00* (2013.01); *F21V 17/00* (2013.01); *F21V 17/02* (2013.01); *F21S 48/1104* (2013.01); *F21S 48/1159* (2013.01); *F21S 48/1305* (2013.01); *F21S 48/137* (2013.01); *B62J 6/04* (2013.01)

(58) Field of Classification Search
CPC ..... F21S 48/212; F21S 48/211; F21S 48/1159; F21S 48/115; F21S 48/1109; F21S 48/1104; B60Q 1/0041
USPC ......... 362/473, 475, 476, 543–549, 240–241, 362/236, 237
See application file for complete search history.

(56) References Cited

U.S. PATENT DOCUMENTS

| | | | | |
|---|---|---|---|---|
| 7,182,494 B2 * | 2/2007 | Nakayama et al. | ........... | 362/545 |
| 7,850,353 B2 * | 12/2010 | Ota et al. | ....................... | 362/545 |
| 2006/0285348 A1 * | 12/2006 | Valcamp et al. | .............. | 362/545 |
| 2010/0246205 A1 * | 9/2010 | Tanaka et al. | ................. | 362/544 |

FOREIGN PATENT DOCUMENTS

JP 2008-238830 A 10/2008

* cited by examiner

*Primary Examiner* — Julie Bannan
(74) *Attorney, Agent, or Firm* — Westerman, Hattori, Daniels & Adrian, LLP

(57) ABSTRACT

A single board is adaptable to lamps for a vehicle of various designs. A lamp for a vehicle includes: an LED light source; a board having a mounting portion on which the LED light source is mounted; and a reflector member which is arranged such that the reflector member covers the LED light source, the reflector member reflecting light emitted from the LED light source with the directivity, wherein the mounting portion is formed of a plurality of mounting portions which are arranged at least in one direction out of the vehicle longitudinal direction and the vehicle lateral direction such that the arrangement of the LED light source is selectable from plural kinds of arrangements, and the reflector member is detachably attached to the board such that the reflector member having a shape corresponding to the arrangement of the LED is selectable.

7 Claims, 15 Drawing Sheets

LAMP FOR VEHICLE

CROSS-REFERENCE TO RELATED APPLICATION

The present application claims priority under 35 U.S.C. §119 to Japanese Patent Application No. 2012-081902, filed Mar. 30, 2012, the contents of which is incorporated herein, by reference, in its entirety.

TECHNICAL FIELD

The present invention relates to a lamp for a vehicle.

BACKGROUND OF THE INVENTION

Recently, versatile designs have been proposed with respect to vehicles such as motorcycles and, along with such a trend, various shapes have been proposed with respect to a shape of a lamp for a vehicle. For example, JP-A-2008-238830 discloses the structure of a taillight where an LED for a stop light and an LED for a taillight are arranged in a spaced-apart manner in the longitudinal direction on a horizontal board, and these LEDs are spaced apart from each other by a reflector.

SUMMARY OF THE INVENTION

Here, a lamp for a vehicle is required to satisfy not only the adaptability to various designs but also the reduction in vehicle manufacturing cost. In the conventional lamp for a vehicle having the constitution disclosed in JP-A-2008-238830, however, mounting positions of the LEDs are preliminarily set and hence, when a shape of the lamp is changed, it is necessary to design a board having LED mounting portions which conform to the shape of the lamp, and such designing of the board causes the pushing up of the manufacturing cost in the small-lot large-kind manufacture of products.

Accordingly, one board is made adaptable to lamps for vehicles of various design.

There is provided a lamp for a vehicle which includes: an LED light source; a board having a mounting portion on which the LED light source is mounted; and a reflector member which is arranged such that the reflector member covers the LED light source, the reflector member reflecting light emitted from the LED light source with the directivity, wherein the mounting portion is formed of a plurality of mounting portions which are arranged at least in one direction out of the vehicle longitudinal direction and the vehicle lateral direction such that the arrangement of the LED light source is selectable from plural kinds of arrangements, and the reflector member is detachably attached to the board such that the reflector member having a shape corresponding to the arrangement of the LED is selectable.

In such a lamp for a vehicle, a plurality of LED positions can be laid out using one kind of board, and the reflector members which match with the positions can be detachably attached to the board. Accordingly, it is unnecessary to design a board for every shape of a lamp and hence, it is possible to provide the LED arrangements which are adaptable to a plurality of lamp shapes using the same board. Particularly, versatile designs can be created in a small space in a headlight having strong frontward inclination (slant) as in the case of a headlight of a motorcycle having a cowling.

Further, the reflector member may include a reflecting portion which reflects the light emitted from the LED light source with the directivity, and an attaching portion which is attached to the board, and the attaching portion may be attached to the board such that the attaching portion covers a mounting surface of the board on which the LED light source is mounted, and the attaching portion may have an opening portion for exposing the LED light source. Due to such a constitution, the attaching portion covers the mounting surface of the board and hence, the protection of the board and the enhancement of the external appearance property of the board can be realized.

Further, the attaching portion may include a first wall portion which covers a front surface of the board, a second wall portion which covers a back surface of the board, and a third wall portion which covers an end surface of the board, and an insertion portion into which the board is detachably inserted may be formed by the first to third wall portions. Due to such a constitution, the board and the reflector member can be mounted and detached with the simple constitution. Further, the first to third wall portions cover the end surface of the board or the like and hence, the external appearance property of the board can be enhanced.

Further, the mounting portion may be formed of a plurality of mounting portions which are arranged at least in the vehicle lateral direction, a plurality of LED light sources which form the LED light source may be mounted on the board in the vehicle lateral direction, the reflector member may be formed of a plurality of reflecting portions corresponding to the respective LED light sources, the reflecting portions reflecting light emitted from the LED light sources with directivity, and each reflecting portion may have a curved surface which is curved so as to surround the LED light source corresponding to the reflecting portion in the lateral direction. Due to such a constitution, the directivity of each LED light source in the target direction can be enhanced.

Further, in the present invention, the mounting portion may be formed of a plurality of mounting portions which are arranged in the vehicle longitudinal direction and in the vehicle lateral direction, a plurality of LED light sources which form the LED light source may be mounted on the board in the vehicle lateral direction, the reflector member may be formed of a plurality of reflecting portions corresponding to the respective LED light sources, the reflecting portions reflecting light emitted from the LED light sources with directivity, at least one of the LED light sources may be arranged in a displaced manner in the vehicle longitudinal direction with respect to other LED light sources, and at least one of the reflecting portions may be arranged in a displaced manner in the vehicle longitudinal direction with respect to other reflecting portions corresponding to the arrangement of the LED light sources. Due to such a constitution, the lamp is adaptable to the design having a concave portion and a convex portion.

Further, the mounting portion may be formed of a plurality of mounting portions which are arranged in the vehicle longitudinal direction and in the vehicle lateral direction, a plurality of LED light sources which form the LED light source may be mounted on the board in the vehicle lateral direction, the reflector member may be formed of a plurality of reflecting portions corresponding to the respective LED light sources, the reflecting portions reflecting light emitted from the LED light sources with directivity, the LED light source on a center side in the vehicle lateral direction may be arranged in a displaced manner toward one directional side in the vehicle longitudinal direction compared to the LED light sources on both end sides in the vehicle lateral direction, and the reflecting portion on a center side in the vehicle lateral direction may be arranged in a displaced manner toward one directional side in the vehicle longitudinal direction compared to the reflecting portions on both end sides in the vehicle lateral direction corresponding to the arrangement of the LED light sources. Due to such a constitution, the lamp is adaptable to the design of a lamp where a center side is indented.

It is thus possible to make one board adaptable to lamps for a vehicle of various designs.

BRIEF DESCRIPTION OF THE DRAWINGS

The advantages of the invention will become apparent in the following description, taken in conjunction with the drawings, wherein.

DETAILED DESCRIPTION OF THE INVENTION

Hereinafter, the explanation is made with respect to a case where a lamp for a vehicle is applied to a motorcycle. However, the lamp for a vehicle is also applicable to other vehicles such as a four-wheeled vehicle. In respective drawings, arrows x, y indicate the horizontal directions which orthogonally intersect with each other, and the direction indicated by an arrow z indicates the vertical direction. The x direction indicates the vehicle longitudinal direction, the y direction indicates the vehicle lateral direction, and the z direction indicates the vehicle vertical direction.

First Embodiment

Whole Constitution of Motorcycle

Figure 1:
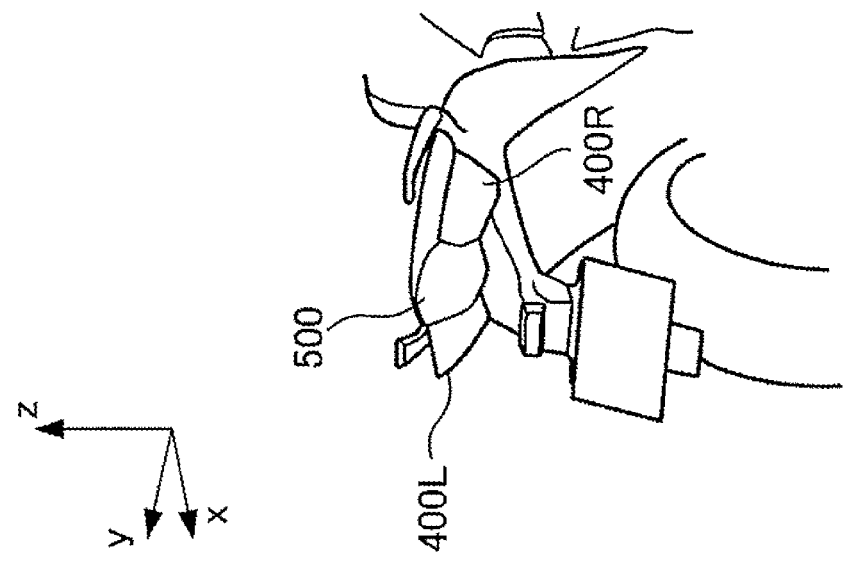
FIG. 1 is an external appearance view of an example of a vehicle (motorcycle)
Figure 1:
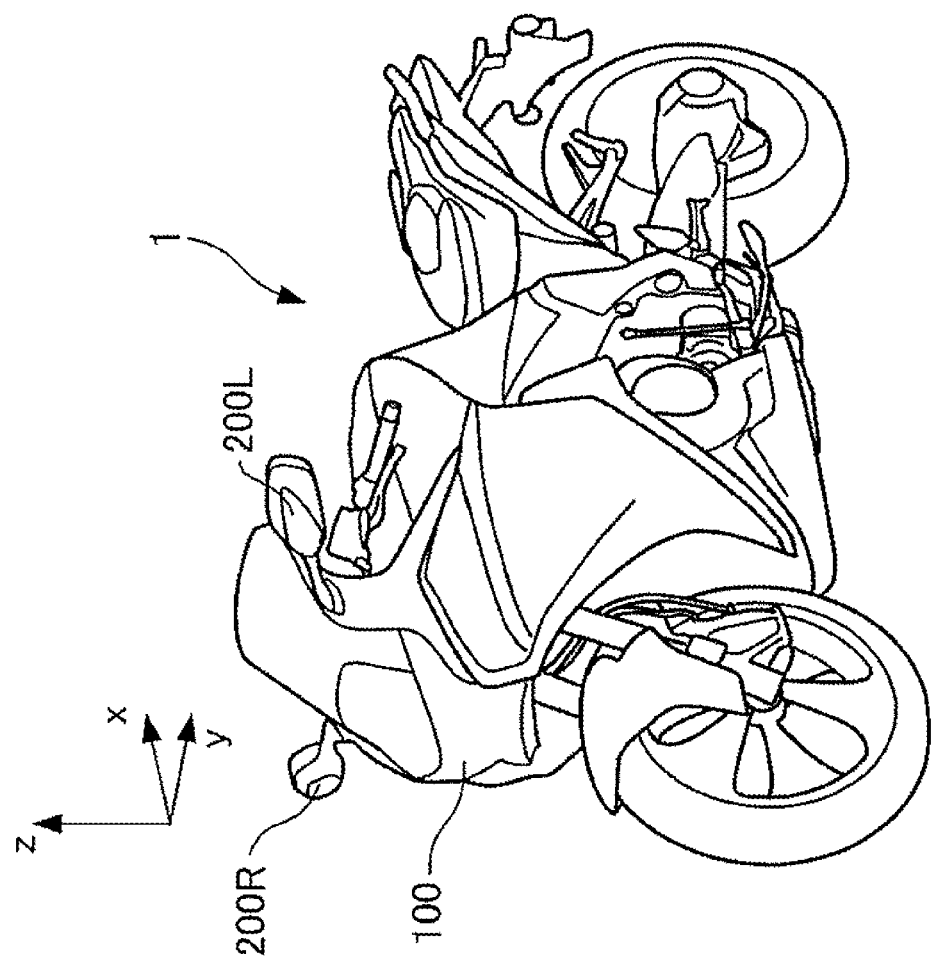

FIG. 1 is an external appearance view of a motorcycle 1. As shown in FIG. 1, the motorcycle 1 includes a headlight unit 100 which is a lamp for a vehicle according to one embodiment at a front portion of the vehicle. As other lamps, the motorcycle 1 also includes front blinkers 200L, 200R on front surfaces of side mirrors, rear blinkers 400L, 400R on a rear side of the vehicle (on both side portions of a taillight 500 in this embodiment, see a view on a right side of the drawing as viewed from a rear side), and the taillight 500 on a rear portion of the vehicle (see a view on a right side of the drawing as viewed from a rear side). Although the case where the present invention is applied to the headlight unit 100 is exemplified in this embodiment, the present invention is also applicable to lamps arranged at other positions such as the taillight 500.

Schematic Constitution of Headlight Unit

Figure 2:
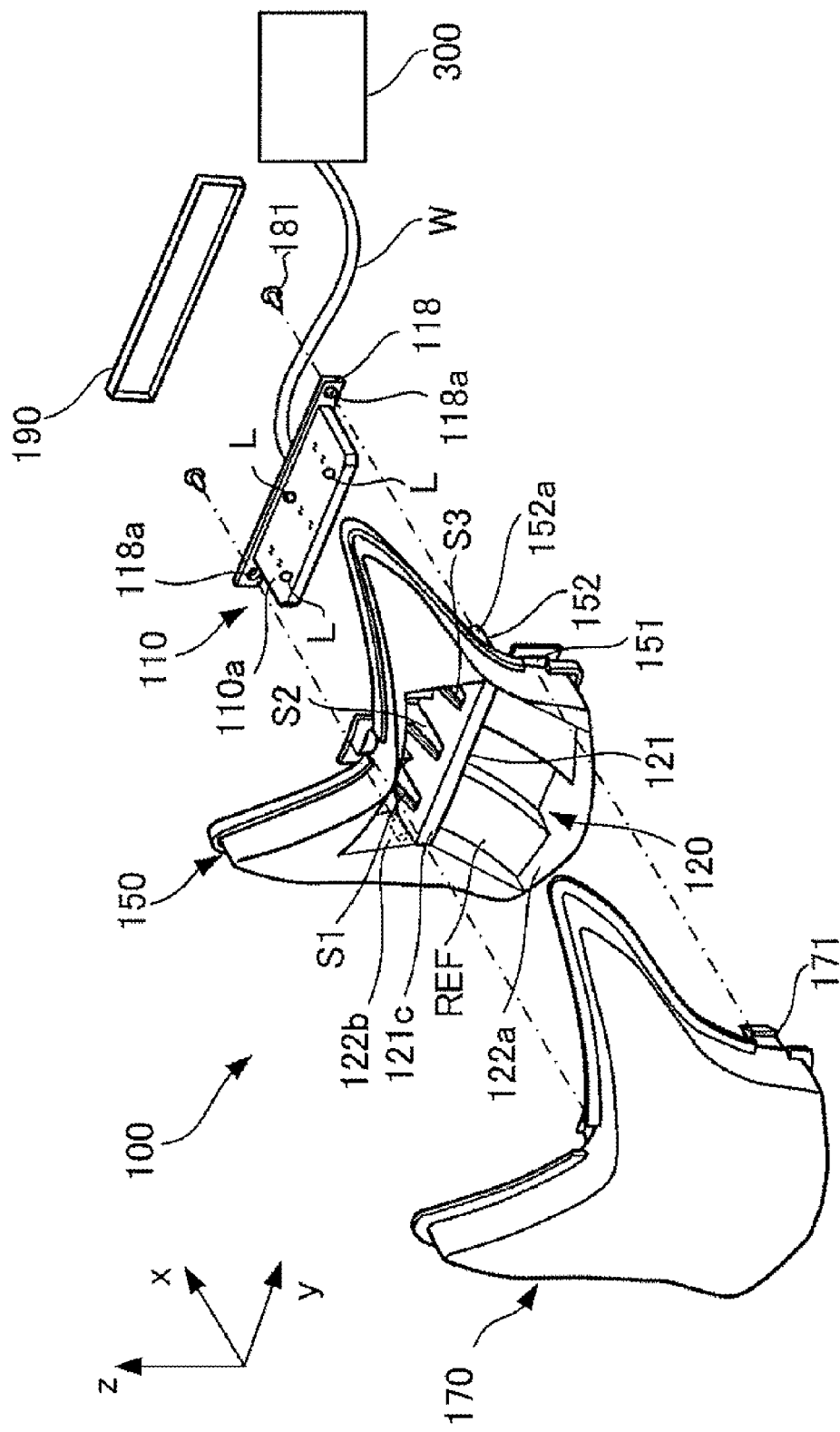
FIG. 2 is an assembly view of a lamp for a vehicle (headlight unit) according to one embodiment which is mounted on the motorcycle shown in FIG. 1.

FIG. 2 is an assembly view of the headlight unit 100. Hereinafter, the constitution of the headlight unit 100 is schematically explained in conjunction with FIG. 2.

The headlight unit 100 includes: a board 110 on which a plurality of LED light sources L are mounted; a reflector member 120; a housing 150; and a lens member 170. In this embodiment, the reflector member 120 is formed as a separate member from the housing 150, and the reflector member 120 and the housing 150 are fixed to each other. However, these members may be formed as an integral body.

In this embodiment, the reflector member 120 includes an attaching portion 121, reflecting portions REF, upper and lower wall surfaces 122a and left and right wall surfaces 122b, and the board 110 is detachably attached to the attaching portion 121 from a rear side of the attaching portion 121. By fitting engaging jigs 181 into holes 118a formed in the mounting member 118 which is fixed to a rear end portion of the board 110 and holes 152a formed in bosses 152 of the housing 150, the board 110 is fixed to the housing 150.

Further, a cover 190 which covers a rear side of the board 110 is mounted on the housing 150 from a rear side of the housing 150, and the lens member 170 is mounted on the housing 150 from a front side of the housing 150.

Figures 4A, 4B, 4C:
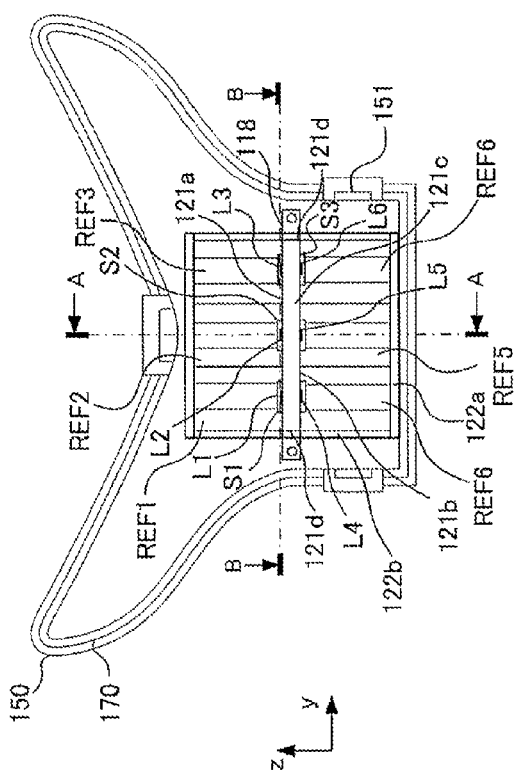
FIG. 4A to FIG. 4C are a front view and cross-sectional views showing a reflector member which is mounted on the board.

The lens member 170 is made of a transparent resin such as polycarbonate, and has pawls 171. By engaging the pawls 171 with engaging holes 151 formed in the housing 150, the lens member 170 is fixed to the housing 150. Here, a sealing member 153 shown in FIG. 4B and FIG. 4C is arranged between the lens member 170 and the housing 150. The sealing member 153 prevents the intrusion of water drops or the like into the inside of the headlight unit 100. Light emitted from the LED light source L or the like is reflected on the reflecting portion REF of the reflector member 120 with the directivity, passes through the lens member 170, and illuminates an area in front of the motorcycle 1. A controller 300 is electrically connected to the board 110 via a wire W, and power is supplied to the board 110 via the wire W.

Constitution of Board

Figure 3A:
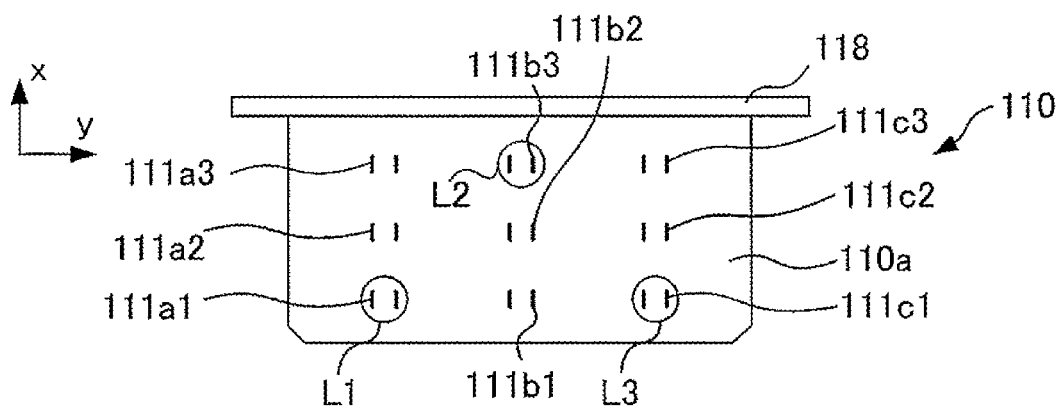
FIG. 3A is a top plan view of a board.
Figure 3B:
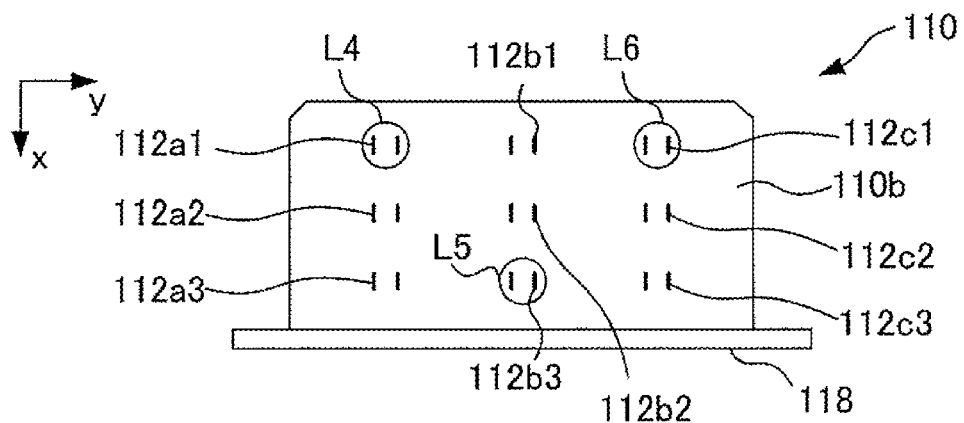
FIG. 3B is a bottom plan view of the board.

The constitution of the board 110 is explained in detail in conjunction with FIG. 3. FIG. 3A is a top plan view of the board 110, and FIG. 3B is a bottom plan view of the board 110. In this embodiment, it is assumed that the board 110 takes a horizontal posture such that the headlight unit 100 is assembled into the motorcycle 1.

The board 110 has a plate shape as a whole, and has a front surface 110a which constitutes an upper surface in an assembled state, and a rear surface 110b which constitutes a lower surface in the assembled state. In this embodiment, it is assumed that the board 110 is formed of a double-sided board, and both the front surface 110a and the rear surface 110b constitute mounting surfaces for mounting the LED light source L respectively. However, the mounting surface may be formed on only one surface of the board 110.

In this embodiment, it is assumed that six LED light sources L in total are mounted on the board 110 as the LED light source L. In the case where the individual LED light sources are to be distinguished from each other, the LED light sources are indicated as LED light sources L1 to L6.

The board 110 forms mounting portions for mounting the LED light sources L on the front surface 110a and the rear surface 110b thereof respectively.

To be more specific, nine mounting portions 111a1 to 111a3, 111b1 to 111b3, and 111c1 to 111c3 in total (hereinafter referred to as a mounting portion 111 when nine mounting portions are collectively designated) are formed on the front surface 110a. Further, nine mounting portions 112a1 to 112a3, 112b1 to 112b3, and 112c1 to 112c3 in total (hereinafter referred to as a mounting portion 112 when nine mounting portions are collectively designated) are formed on the rear surface 110b.

It is sufficient that each mounting portion 111, 112 includes at least an electrode to which the LED light source L is electrically connected. Further, for facilitating the mounting of the LED light source L, the mounting portion 111, 112 may preferably be formed of a socket which enables the electrical connection by insertion.

The mounting portions 111 on the front surface 110a are arranged at a plurality of (three in this embodiment) positions in the vehicle longitudinal direction, and are also arranged at a plurality of (three in this embodiment) positions in the vehicle widthwise direction. With respect to suffixes added to symbol indicating the mounting portion 111, each letter (a, b, c) indicates a column where the mounting portions 111 are at the same position in the vehicle lateral direction, and each numeral (1, 2, 3) indicates a row where the mounting portions 111 are at the same position in the vehicle longitudinal direction. For example, although the mounting portions 111a1 to 111a3 differ from each other with respect to the position in the vehicle longitudinal direction, the mounting portions 111a1 to 111a3 are at the same position with respect to the vehicle lateral direction. Further, although the mounting portions 111a1, 111b1, 111c1 differ from each other with respect to the position in the vehicle lateral direction, the mounting portions 111a1, 111b1, 111c1 are at the same position with respect to the vehicle longitudinal direction. In this manner, the mounting portions 111 on the front surface 110a are arranged in a matrix array of 3×3.

In the same manner as the mounting portion 111 on the front surface 110a, the mounting portions 112 on the rear surface 110b are also arranged in a matrix array of 3×3, and the way of laying out the columns and the rows using suffixes added to symbol 112 indicating the mounting portion is equivalent to the above-mentioned way of laying out the columns and the rows with respect to the mounting portion 111. Further, in this embodiment, the mounting portion 111 and the mounting portion 112 which have the same suffix constitute a pair having a front-back relationship while being arranged at the same position in the vehicle longitudinal direction as well as in the vehicle lateral direction. For example, on a back side of the mounting portion 111a1 formed on the front surface 110a, the attaching portion 112a1 formed on the back surface 110b is positioned.

In this embodiment, it is assumed that three LED light sources L1 to L3 are mounted on the front surface 110a, and it is particularly assumed that one LED light source is mounted for each column of the mounting portion 111. In the example shown in FIG. 3A, although the case where the LED light sources L1, L2, L3 are mounted on the mounting portions Ma1, 111b3, 111c1 respectively is exemplified, any arrangement of the LED light sources L1 to L3 can be selected from among 27 possible arrangements (3×3×3=27).

Further, it is assumed that three LED light sources L4 to L6 are also mounted on the rear surface 110b and, in the same manner as the front surface 110a, it is assumed that one LED light source is mounted in each column of the mounting portion 112. In the example shown in FIG. 3B, although the case where the LED light sources L4, L5, L6 are mounted on the mounting portions 112a1, 112b3, 112c1 respectively is exemplified, any arrangement of the LED light sources L4 to L6 can be selected among the 27 possible arrangements (3×3×3=27).

Although the plurality of mounting portions 111 and the plurality of mounting portions 112 are arranged in the vehicle longitudinal direction as well as in the vehicle lateral direction in this embodiment, it is sufficient that the plurality of mounting portions 111, 112 are arranged at least in either the vehicle longitudinal direction or the vehicle lateral direction. For example, the plurality of mounting portions 111, 112 may be arranged only in the vehicle lateral direction, or may be arranged only in the vehicle longitudinal direction. Further, the number of mounting portions 111, 112 in one direction is not limited to three, and may be two or four or more. Needless to say, the larger the number of mounting portions 111, 112, the larger the number of possible arrangements becomes.

Further, even in the case where the plurality of mounting portions 111 and the plurality of mounting portions 112 are arranged in the vehicle longitudinal direction as well as in the vehicle lateral direction, it is not always necessary to arrange the mounting portions in a matrix array as in the case of this embodiment. However, there may be a case where the arrangement of the mounting portions in a matrix array is superior to a random arrangement of the mounting portions with respect to the degree of freedom in the design.

In this embodiment, the mounting portions 111 and the mounting portions 112 make a pair having a front-back relationship in this embodiment. However, the mounting portions 111 and the mounting portions 112 may be arranged differently from each other.

Further, the relationship between the number of mounting portions 111, 112 and the number of LED light sources L is not limited to the relationship described in this embodiment (9 to 3), and it is sufficient for the number of mounting portions 111, 112 to only outnumber the number of LED light sources L.

Constitution of Reflector Member

Figure 5:
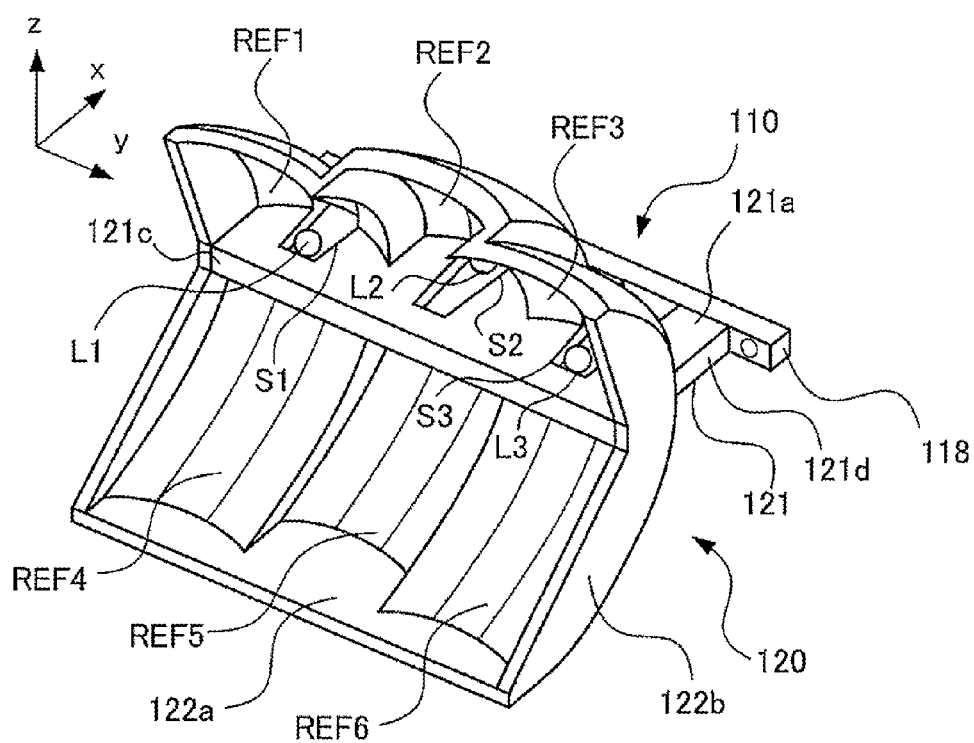
FIG. 5 is a perspective view showing the reflector member which is mounted on the board.

The reflector member 120 is explained in conjunction with FIG. 4 and FIG. 5. FIG. 4A is a front view of the reflector member 120 to which the board 110 is attached, FIG. 4B is a cross-sectional view taken along a line A-A in FIG. 4A, and FIG. 4C is a cross-sectional view taken along a line B-B in FIG. 4A. FIG. 5 is a perspective view of the reflector member 120 to which the board 110 is attached. In FIG. 5, for clearly showing portions to be explained, out of the upper and lower wall surfaces 122a, the upper wall surface 122a is omitted from the drawing.

As the arrangement of the LED light sources L1 to L6, the arrangement shown in FIG. 3 is adopted, and the reflector member 120 having a shape which corresponds to the arrangement of the LED light sources L is selectively mounted. In other words, the arrangement of the LED light sources L is selected corresponding to the shape of the reflector member 120.

The reflector member 120 includes an attaching portion 121, the reflecting portions REF (1 to 6), the upper and lower wall surfaces 122a, and left and right wall surfaces 122b.

The attaching portion 121 includes: an upper wall portion 121a which covers the front surface 110a of the board 110; a lower wall portion 121b which covers the rear surface 110b of the board 110; a front wall portion 121c which covers a front end surface of the board 110; and a pair of side wall portions 121d, and has a box shape with a rear portion thereof opened. An insertion portion into which the board 110 is detachably inserted is formed by these wall portions. In this manner, according to this embodiment, the board 110 and the reflector member 120 can be mounted and detached with the simple constitution.

Slit-shaped opening portions S1 to S3 are formed on the attaching portion 121. The opening portions S1 to S3 are formed on both of the wall portions 121a, 121b, and are formed corresponding to the arrangement of the mounting portions 111, 112. To explain the attaching portion 121 also in conjunction with FIG. 3, the opening portion S1 is formed at a position which corresponds to the column of the mounting portions 111a1 to 111a3 and the column of the mounting portions 112a1 to 112a3. The opening portion S2 is formed at a position which corresponds to the column of the mounting portions 111b1 to 111b3 and the column of the mounting portions 112b1 to 112b3. The opening portion S3 is formed at a position which corresponds to the column of the mounting portions 111c1 to 111c3 and the column of the mounting portions 112c1 to 112c3.

As described above, in this embodiment, it is assumed that one LED light source L is mounted for each column of the mounting portions 111, 112. Accordingly, the opening portions S1 to S3 are formed corresponding to these columns. Due to such a constitution, when the board 110 is attached to the attaching portion 121, the LED light sources L1 to L6 can be exposed from the attaching portion 121 through the opening portions S1 to S3.

In this embodiment, by taking the assembling property into consideration, the opening portions S1 to S3 are formed into a notched shape where a rear side of the opening portion is opened. However, the opening portions S1 to S3 may be formed into a hole shape where the periphery of the opening portion is closed. In this case, however, it is necessary to employ a means such as a constitution which allows the mounting of the LED light sources L after the board 110 is attached to the attaching portion 121 or a means which makes the wall portion 121a and the wall portion 121b of the attaching portion 121 separable.

In this embodiment, a constitution is adopted where the wall portions 121a, 121b cover the front surface 110a and the rear surface 110b of the board respectively, and the wall portion 121c covers a front end surface of the board 110. Accordingly, the largest portion of the board 110 is not exposed to the outside so that the external appearance property of the headlight unit 100 is enhanced and thereby the external appearance property of the motorcycle 1 is also enhanced. Particularly, the board 110 is liable to be visually recognized from the outside through the lens member 170 when the front end surface of the board 110 is exposed. In this embodiment, however, the board 110 is concealed by the wall portion 121c and hence, it is possible to acquire a high external-appearance-property enhancing effect. Further, the board 110 can be also protected by these wall portions. Still further, in the case where the wall portions 121a and wall portion 121b are formed using a light blocking material, it is possible to prevent a leakage of light from the LED light sources L1 to L6 which is emitted in the directions other than the target direction.

Inner surfaces of the reflecting portions REF1 to REF6 are formed of a mirror surface respectively so as to reflect light emitted from the LED light sources L1 to L6 with directivity. As treatment for forming the inner surface of the reflecting portion into a mirror surface, the application of plating to a base material made from an ABS resin is named as a typical example.

In this embodiment, the reflecting portions REF are arranged corresponding to the respective LED light sources L. In this embodiment, six LED light sources L1 to L6 are mounted and hence, six reflecting portions REF1 to REF6 are provided.

Each reflecting portion REF extends frontward from a side behind LED light source L in an arcuately curved shape.

The reflecting portions REF1 to REF3 corresponding to the LED light sources L1 to L3 on a front surface 110a side respectively extend upwardly from the wall portion 121a, and the reflecting portions REF4 to REF6 corresponding to the LED light sources L4 to L6 on a rear surface 110b side extend downwardly from the wall portion 121b. In this embodiment, in this manner, the LED light sources L1 to L6 and the reflecting portions REF1 to REF6 are arranged on both the front surface 110a side and the rear surface 110b side of the board 110 and hence, it is possible to change over the LED light sources L which emit light between the upper LED light sources L and the lower LED light sources L. For example, the direction along which the light is emitted can be switched between the LED light sources for a high beam (light emitted from the LED light sources L4 to L6) and the LED light sources for a low beam (light emitted from the LED light sources L1 to L3).

In this embodiment, the respective reflecting portions REF1 to 6 not only extend frontward from a side behind the LED light source L in an arcuately curved shape but also are curved in an arcuate shape in the lateral direction so as to surround the corresponding LED light sources L. That is, the reflecting portions REF1 to REF6 are curved on both a cross section parallel to an xy plane and a cross section parallel to an xz plane. Due to such a constitution, the directivity of the respective LED light sources L1 to L6 in the target directions can be enhanced.

Controller

Figure 6:
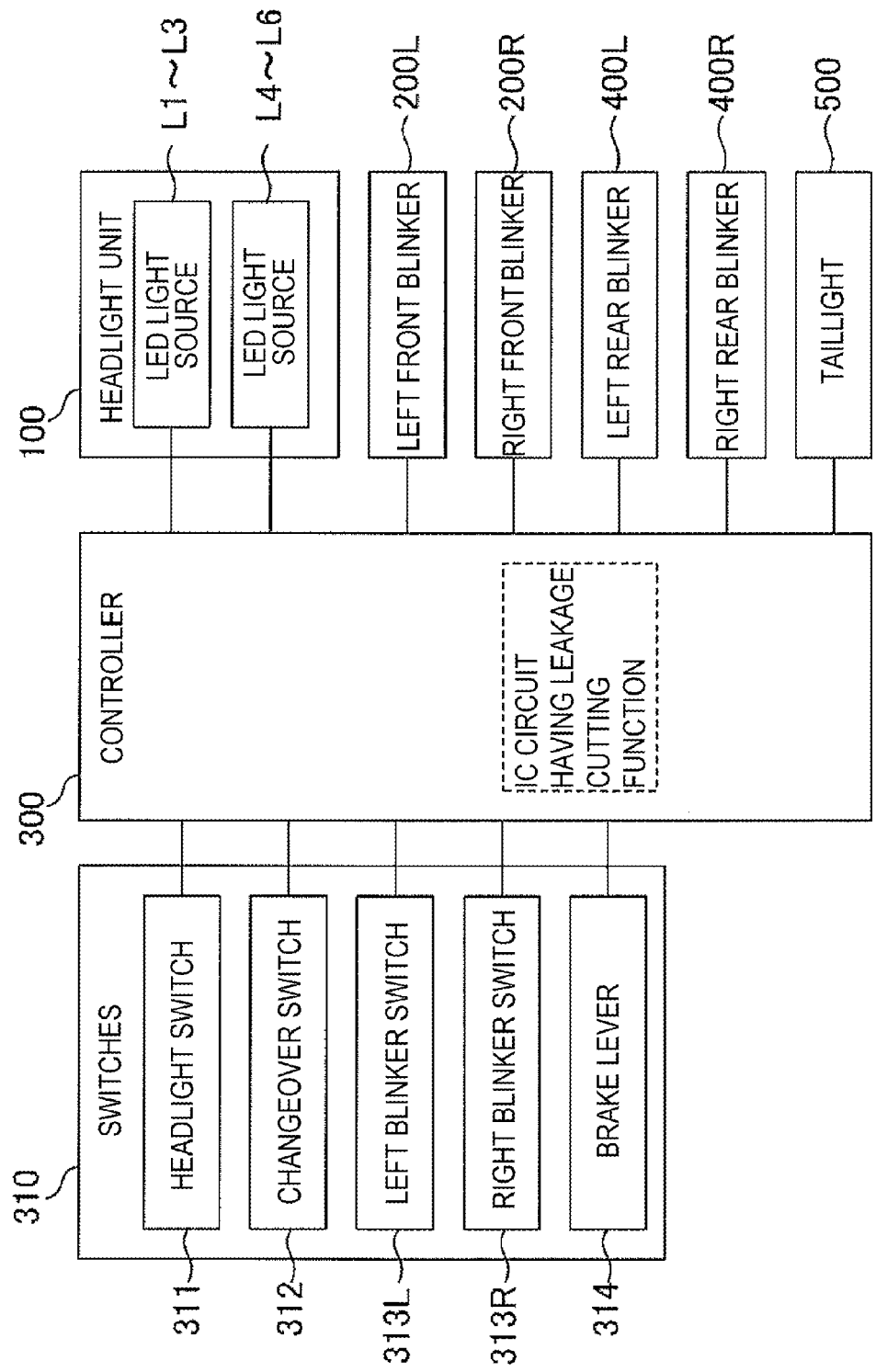
FIG. 6 is a block diagram of a controller and parts arranged around the controller.

FIG. 6 is a block diagram of the controller 300 which controls lighting of lamps which are mounted on the motorcycle 1 and parts arranged around the controller 300. In response to the detection of the manipulation of the switches 310, the controller 300 turns on the corresponding lamps.

The switches 310 include: a headlight switch 311, a high-beam/low-beam changeover switch 312, left and right blinker switches 313L, 313R, a brake lever 314 for turning on a brake light 410 (assembled into the inside of the taillight) and the like.

It is preferable that the controller 300 is constituted of a control circuit which has a function of cutting a leak current (leakage cutting function). In general, the LED light source emits light slightly even with an extremely small electric current. Accordingly, there may be a case where the LED light source emits light with a leak current. It may be possible to cope with such a drawback by adding a leakage cutting circuit. However, providing a leakage cutting circuit to each LED light source is disadvantageous in terms of a manufacturing cost. In view of the above, with the use of a control circuit having a function of cutting leak currents generated in a plurality of LED light sources as the controller 300, it is possible to cut the leak currents collectively without adding the plurality of leakage cutting circuits.

Also in this embodiment, output ports which are independent from each other are allocated to the left front blinker 200L and the left rear blinker 400L which are synchronously turned on or off and to the right front blinker 200R and the right rear blinker 400R which are synchronously turned on or off respectively. It is also possible to adopt the constitution where the output ports of the controller 300 are also used in common as the output ports and a line is bifurcated to a left side and a right side in the middle of the line, and the bifurcated lines are connected to the blinkers on a left side and the blinkers on a right side respectively. However, such a constitution is required to take a waterproof measure at a portion where the line is bifurcated. Accordingly, in view of a point that it is unnecessary to take such a waterproof measure at the line bifurcated portion, it is advantageous to adopt the constitution where products to which a waterproof measure is already applied are used at an output port of the controller 300 and input ports of the respective lights individually, and the independent output ports are allocated to the respective left and right blinkers as in the case of this embodiment.

Examples of Combination of Arrangement of LED Light Sources and Reflector Members The board 110 of this embodiment preliminarily includes the plurality of mounting portions 111, 112 for mounting the LED light sources L in the vehicle longitudinal direction as well as in the vehicle lateral direction, and the arrangement of the LED light sources L can be selected in view of these mounting portions 111, 112. That is, a plurality of LED positions can be laid out using one kind of board 110.

Accordingly, the reflector members 120 which correspond to the LED positions can be mounted or, in the opposite case, the LED positions which correspond to a shape of the reflector member 120 can be selected. Accordingly, it is unnecessary to design the board 110 for every shape of a lamp and hence, it becomes possible to provide the LED arrangements corresponding to a plurality of lamp shapes using the same board 110. Accordingly, it is possible to make one board 110 adaptable to lamps for vehicles of various designs.

Hereinafter, the explanation is made with respect to examples of combination of the arrangement of the LED light sources L and the reflector member 120. Among drawings which are referenced in the explanation made hereinafter, in perspective views (FIG. 8, FIG. 10A and FIG. 10B, FIG. 12 and FIG. 14), for clearly illustrating portions to be explained, out of upper and lower wall surfaces 122a, the upper wall surface 122a is omitted from the drawing.

Example of Combination 1

The example 1 is an example of combination of the LED positions shown in FIG. 3 which are already explained and the reflector member 120 shown in FIG. 4 and FIG. 5.

In this example, to focus on a front surface 110a side of the board 110, the LED light sources L1, L3 on both end sides in the lateral direction are mounted on the front most mounting portions Ma1, 111c1 respectively, and the LED light source L2 on a center side is arranged on the rearmost mounting portion 111b3. That is, the LED light source L2 on a center side is arranged in a displaced manner in the vehicle longitudinal direction with respect to other LED light sources L1, L3.

Corresponding to such an arrangement, among the reflecting portions REF1 to REF3 of the reflector member 120, the reflecting portion REF2 on a center side is arranged in a displaced manner in the vehicle longitudinal direction with respect to other reflecting portions REF1, REF3.

This example is an example where at least one LED light source L (L2) is arranged in a displaced manner in the vehicle longitudinal direction with respect to other LED light sources L (L1, L3), and at least one reflecting portion REF (REF2) is arranged in a displaced manner in the vehicle longitudinal direction with respect to other reflecting portions REF (REF1, 3) corresponding to the arrangement of the LED light sources L. Due to such a constitution, this example is adaptable to a design having a concave portion and a convex portion such as a design where a portion of the lens member 170 is indented, for example. Particularly, the LED light source L2 on a center side and the reflecting portion REF2 corresponding to the LED light source L2 are displaced toward one directional side (rear side) in the vehicle longitudinal direction and hence, such a combination of the arrangement of the LED position and the reflector member 120 is adaptable to the design where a center portion of the lens member 170 is indented.

Here, the LED light sources L4 to L6 and the reflecting portions REF4 to REF6 corresponding to the LED light sources L4 to L6 on a rear surface 110b side of the board 110 have the same constitution as the LED light sources L1 to L3 and the reflecting portions REF1 to REF3 on a front surface 110a side.

Example of Combination 2

Figure 7A:
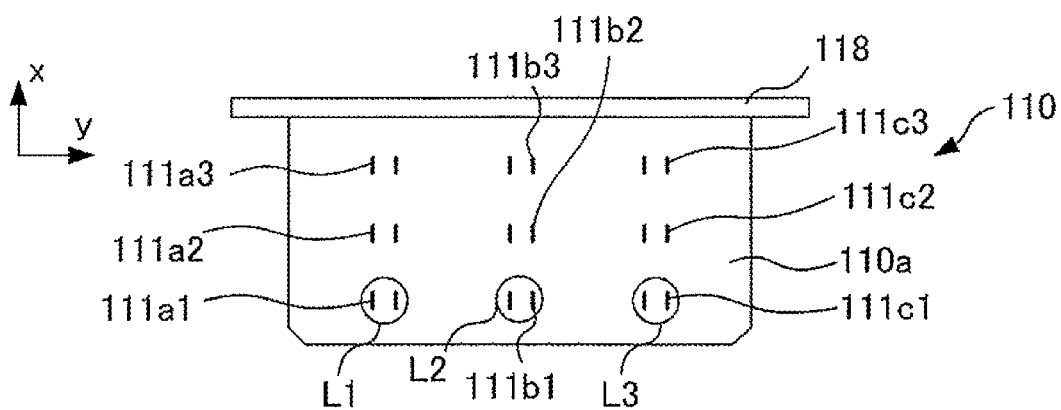
FIG. 7A and FIG. 7B are views showing variations of the arrangement pattern of LED light sources.
Figure 7B:
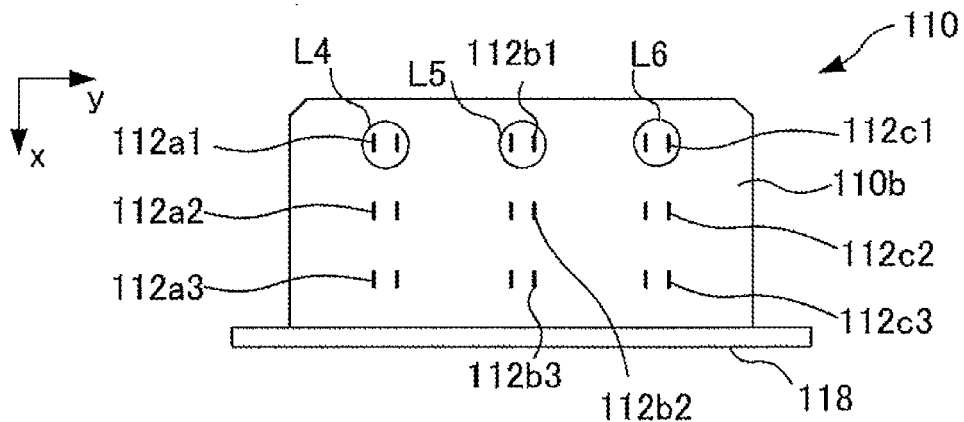
Figure 8:
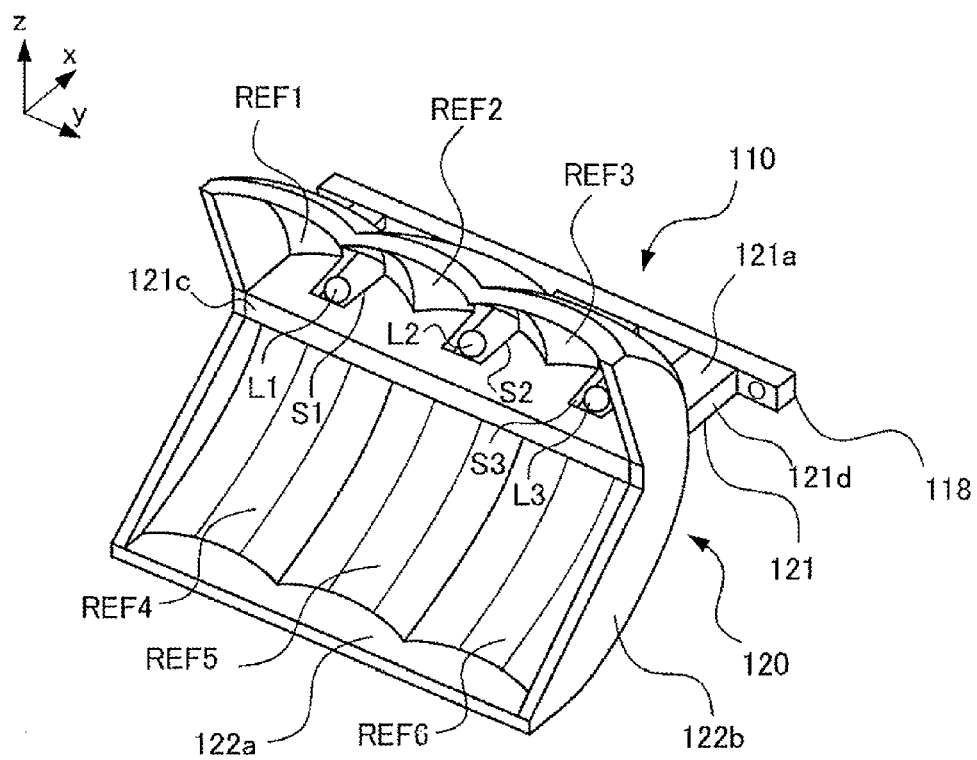
FIG. 8 is a view showing the arrangement of reflecting portions of a reflector member which corresponds to a board shown in FIG. 7.

In the example of combination 2, the LED positions are shown in FIG. 7, and the reflector member 120 to which the board 110 is attached is shown in FIG. 8. Here, FIG. 7A is a top plan view of the board 110, and FIG. 7B is a bottom plan view of the board 110.

As shown in FIG. 7, in this example, all LED light sources L1 to L6 are mounted on the frontmost mounting portions 111a1 to 111c1, 112a1 to 112c1 respectively such that positions of the LED light sources L1 to L6 are aligned with each other in the vehicle longitudinal direction. That is, the LED light sources L1 to L6 are arranged on a laterally extending straight line. Further, as shown in FIG. 8, corresponding to the arrangement of the LED light sources L1 to L6, the reflecting portions REF1 to REF6 are also arranged such that there is no displacement among them in the vehicle longitudinal direction. Such an arrangement is preferably adopted when the lens member 170 has a flat shape.

Example of Combination 3

Figure 9A:
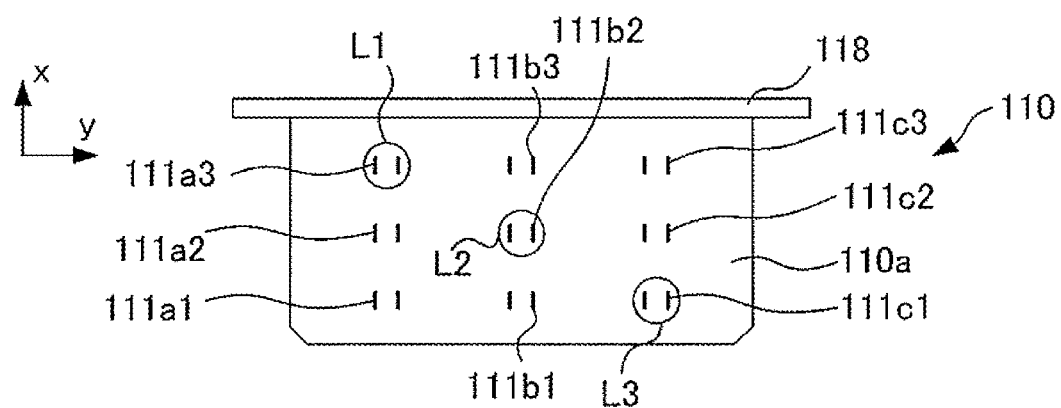
FIG. 9A and FIG. 9B are views showing a variation of the arrangement pattern of LED light sources.
Figure 9B:
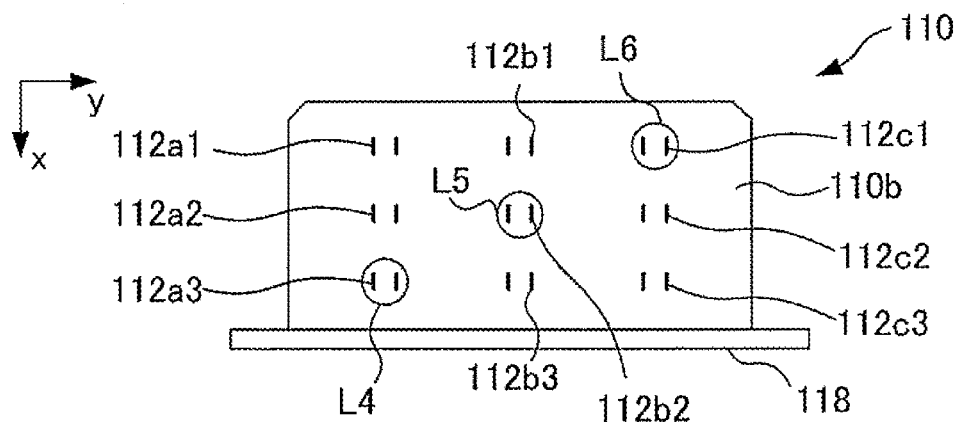
Figures 10A, 10B:
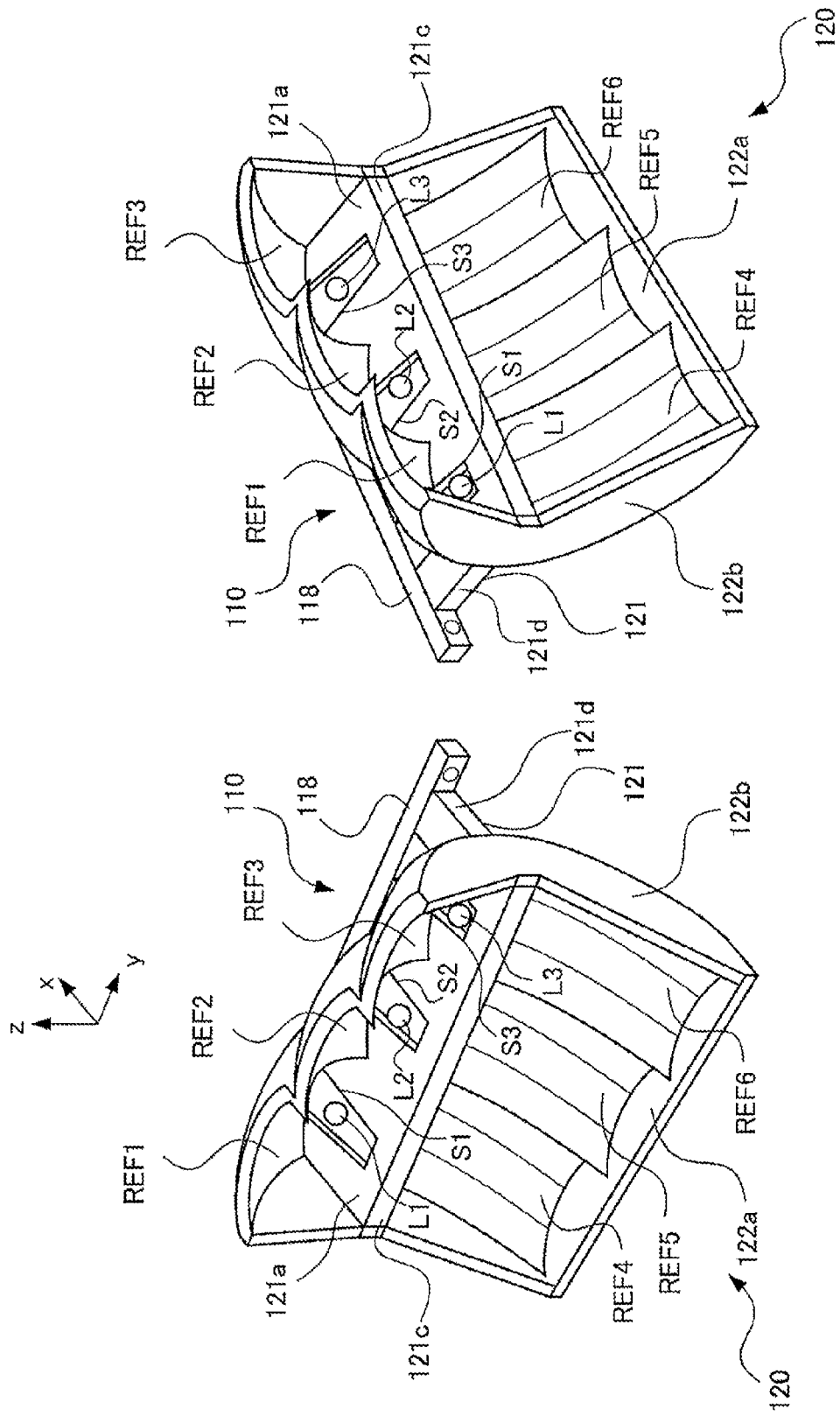
FIG. 10A and FIG. 10B are views showing the arrangement of reflecting portions of a reflector member which corresponds to a board shown in FIG. 9.

In the example of combination 3, the LED positions are shown in FIG. 9, and the reflector member 120 to which the board 110 is attached is shown in FIG. 10A. Here, FIG. 9A is a top plan view of the board 110, and FIG. 9B is a bottom plan view of the board 110.

The explanation is made in conjunction with FIG. 9. To focus on a front surface 110a side of the board 110, in this example, all LED light sources L1 to L3 are arranged in a displaced manner from each other in the vehicle longitudinal direction. Further, the LED light sources L1 to L3 are displaced in order in the lateral direction.

Corresponding to the arrangement of the LED light sources L1 to L3, as shown in FIG. 10A, all reflecting portions REF1 to REF3 of the reflector member 120 are arranged in a displaced manner from each other in the vehicle longitudinal direction, and the reflecting portions REF1 to REF3 are displaced in order in the lateral direction.

Here, the LED light sources L4 to L6 and the reflecting portions REF4 to REF6 corresponding to the LED light sources L4 to L6 on a rear surface 110b side of the board 110 have the same constitution as the LED light sources L1 to L3 and the reflecting portions REF1 to REF3 on a front surface 110a side.

In this example, for example, a reflector 120 shown in FIG. 10B which has LED light sources L and reflecting portions REF arranged in left-right symmetry with the LED light sources L and the reflecting portions REF of the reflector 120 shown in FIG. 10A can be used as a set with the reflector 120 shown in FIG. 10A, wherein one reflector 120 is used for a right side and the other reflector 120 is used for a left side. Two sets of reflector 120 may be applied to one streamline shaped lens member 170, or a lens member 170 for a right side and a lens member 170 for a left side are prepared respectively as a binocular type and one set of reflectors 120 may be applied to the individual lens member 170.

Example of Combination 4

Figure 11A:
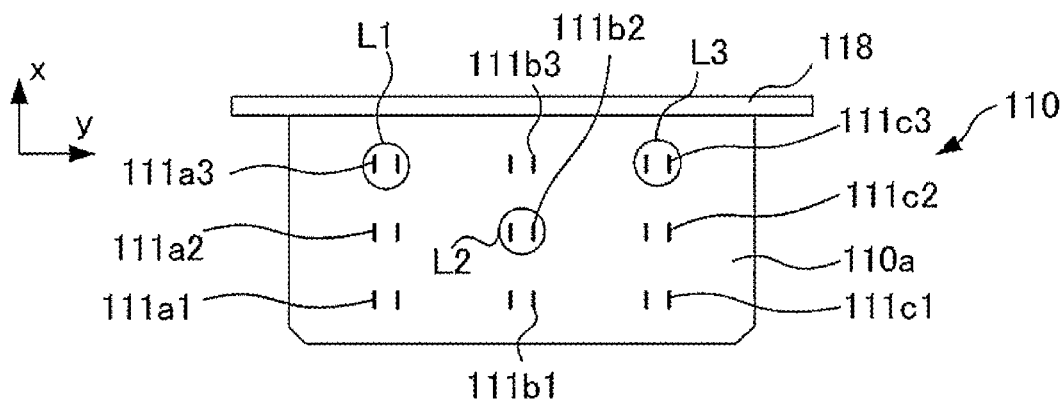
FIG. 11A and FIG. 11B are views showing a variation of the arrangement pattern of LED light sources.
Figure 11B:
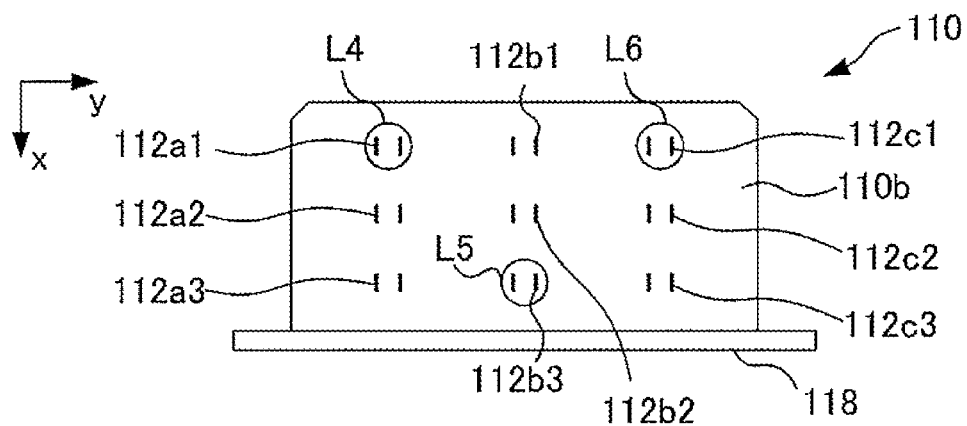
Figure 12:
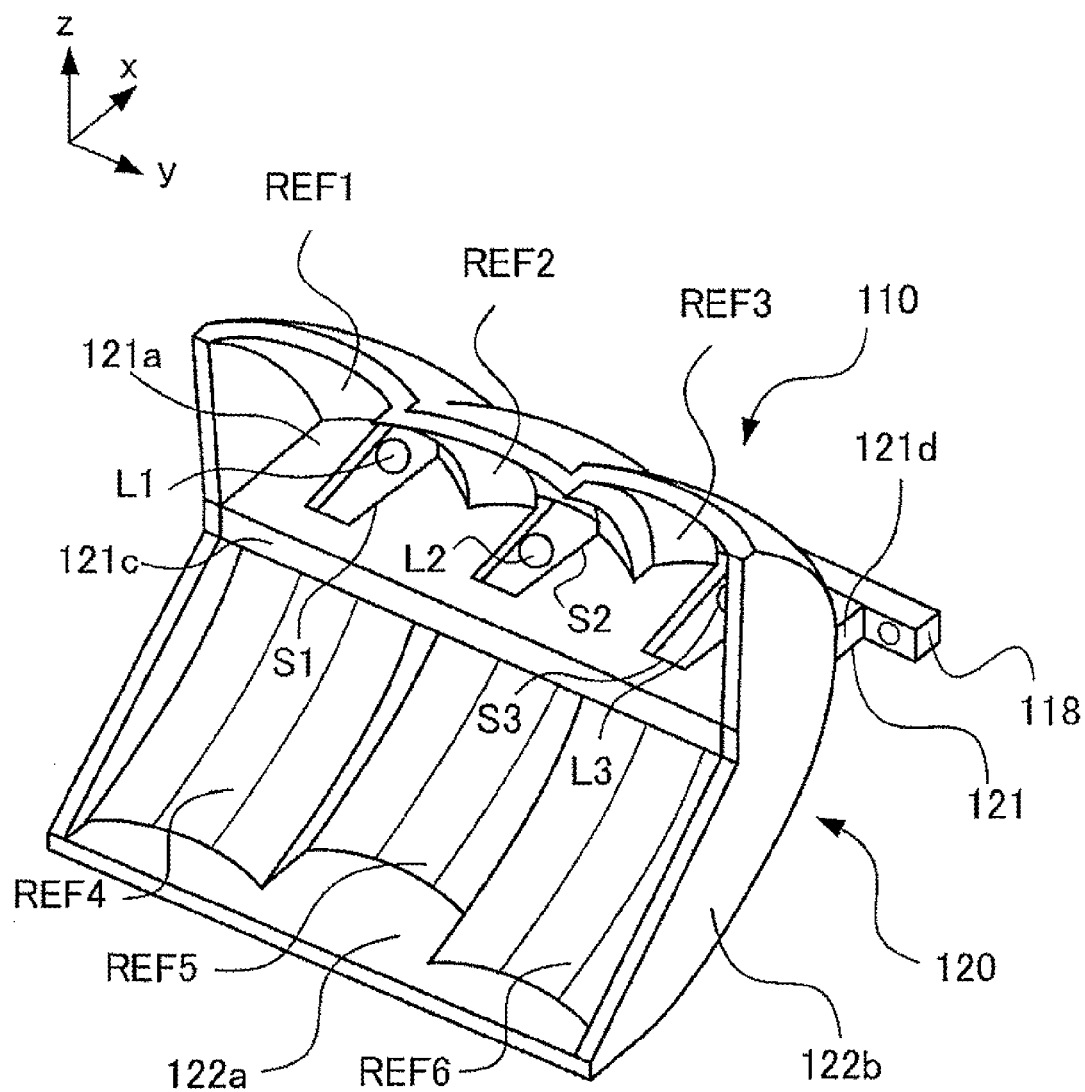
FIG. 12 is a view showing the arrangement of reflecting portions of a reflector member which corresponds to a board shown in FIG. 11.

In the example of combination 4, the LED positions are shown in FIG. 11, and the reflector member 120 to which the board 110 is attached is shown in FIG. 12. Here, FIG. 11A is a top plan view of the board 110, and FIG. 11B is a bottom plan view of the board 110.

As shown in FIG. 11, in this example, the arrangement of the LED light sources L differs between a front surface 110a side of the board 110 and a rear surface 110b side of the board 110. As described above, in this embodiment, the mounting portion 111 and the mounting portion 112 constitute a pair having a front-back relationship. In the examples explained heretofore, with respect to the pair made of the mounting portions 111, 112 which are arranged at the same positions in the vehicle lateral direction, the LED light sources L are mounted at the same positions also in the vehicle longitudinal direction. For example, to explain the example shown in FIG. 9, the LED light source L1 on a front surface 110a side and the LED light source L4 on a rear surface 101b side constitute a pair while assuming the same position in the vehicle lateral direction. The LED light source L1 on the front surface 110a side and the LED light source L4 on the rear surface 101b side also assume the same position (rearmost portion) in the vehicle longitudinal direction. The same goes for a pair constituted of the LED light source L2 and the LED light source L5 and a pair constituted of the LED light source L3 and the LED light source L6.

On the other hand, in this example shown in FIG. 11, with respect to a pair of the LED light sources L1, L4, the LED light source L1 is mounted on the mounting portion 111a3 on a rear side of the vehicle, and the LED light source L4 is mounted on the mounting portion 112a1 on a front side of the vehicle. That is, the LED light source L1 on a front surface side and the LED light source L4 on a rear surface side are arranged in a displaced manner in the vehicle longitudinal direction.

With respect to a pair of the LED light sources L2, L5, the LED light source L2 is mounted on the mounting portion 111b2 at an intermediate portion, and the LED light source L5 is mounted on the mounting portion 112b3 on a rear side of the vehicle so that the LED light sources L2, L5 are arranged in a displaced manner in the vehicle longitudinal direction. Also with respect to a pair of the LED light sources L3, L6, the LED light source L3 is mounted on the mounting portion 111c3 on a rear side of the vehicle, and the LED light source L6 is mounted on the mounting portion 111c1 on a front side of the vehicle so that the LED light sources L3, L6 are arranged in a displaced manner in the vehicle longitudinal direction.

The reflecting portions REF1 to REF6 are also arranged as shown in FIG. 12 corresponding to such LED positions. That is, on a front surface 110a side, the reflecting portions REF1, REF3 are arranged at the rear positions, and the reflecting portion REF2 is arranged at the intermediate position. On the other hand, on a rear surface 110b side, the reflecting portions REF4, REF6 are arranged at the front position, and the reflecting portion REF5 is arranged at the rear position.

This example is adaptable to a design where a shape of the lens member 170 differs between an upper side and a lower side of the vehicle, for example. Although the LED light sources L on a front surface side and the LED light sources L on a rear surface side are mounted in a displaced manner in the vehicle longitudinal direction with respect to all pairs of LED light sources L in this example, the LED light sources may be arranged in a displaced manner with respect to only some pairs of LED light sources L. Also in such a case, the reflecting portions REF are arranged corresponding to the arrangement of the LED light sources L.

Example of Combination 5

Figure 13A:
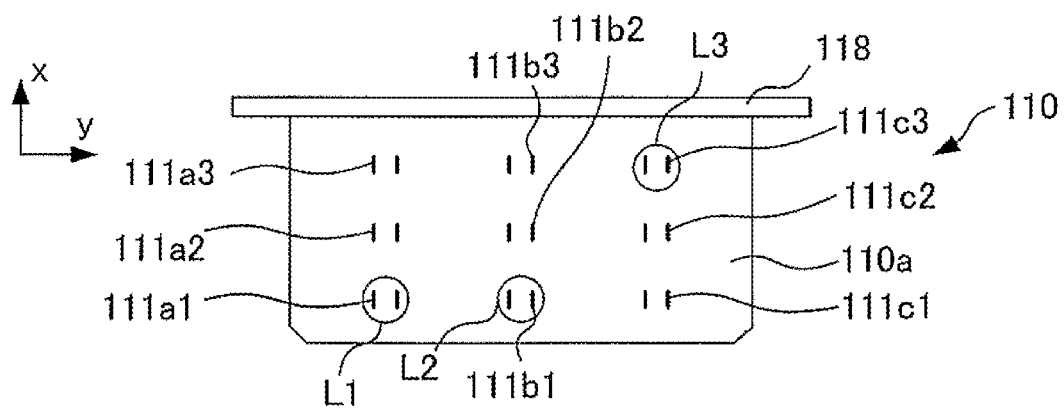
FIG. 13A and FIG. 13B are views showing a variation of the arrangement pattern of LED light sources.
Figure 13B:
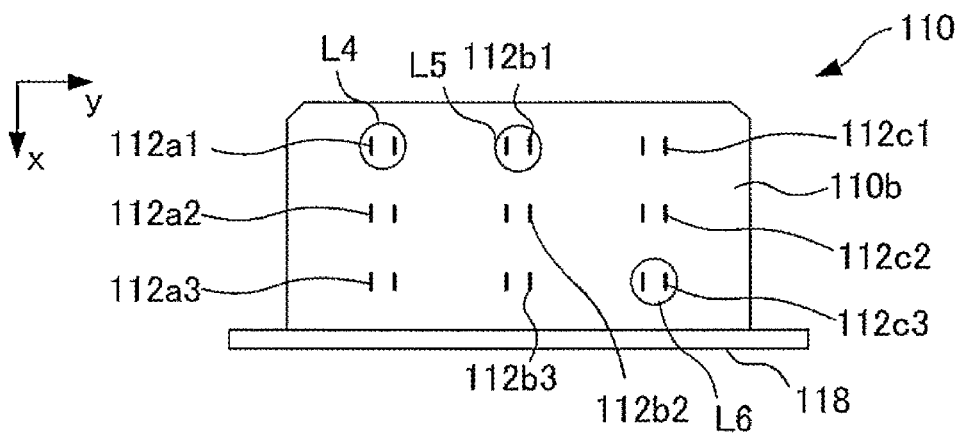
Figure 14:
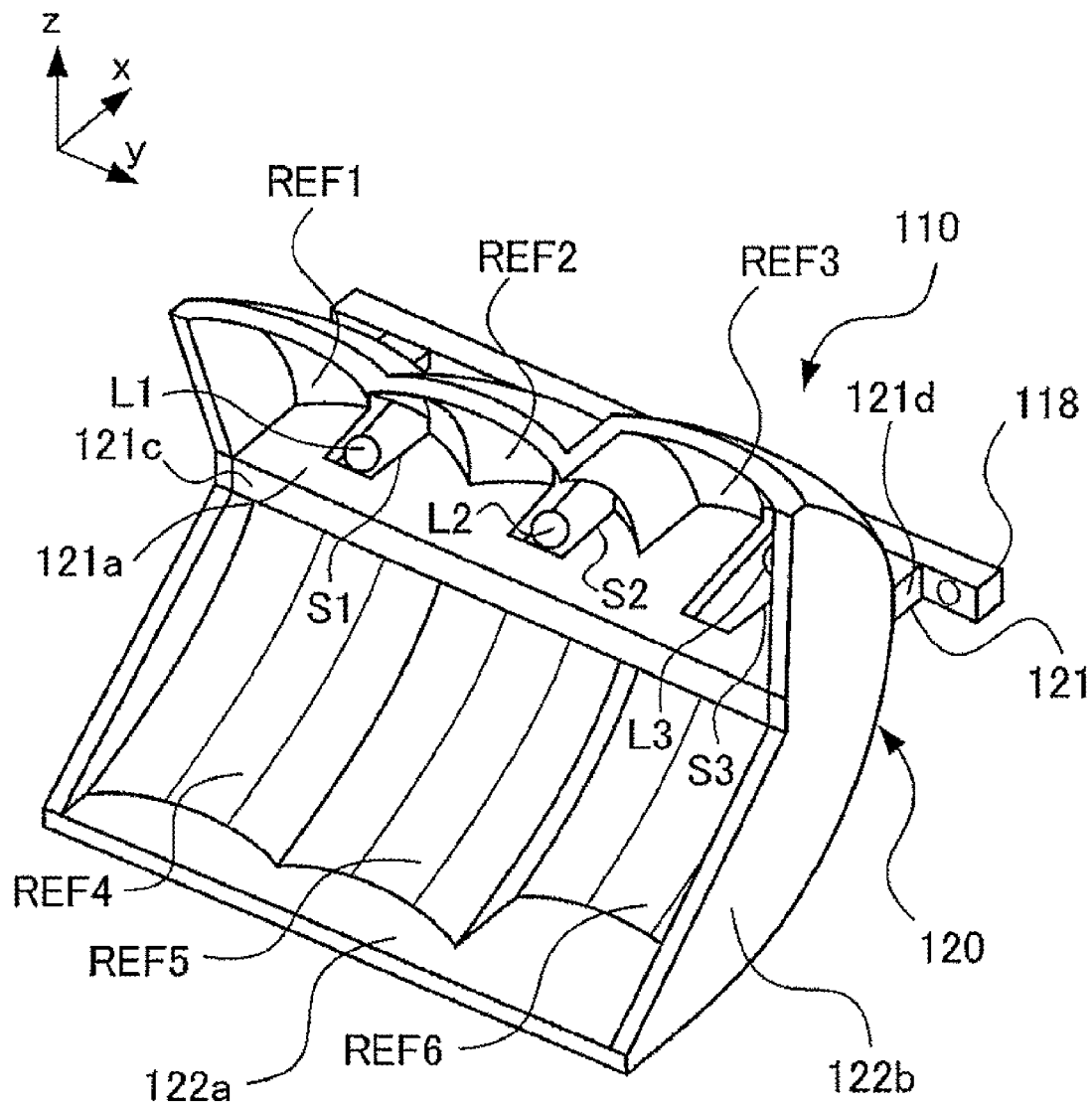
FIG. 14 is a view showing the arrangement of reflecting portions of a reflector member which corresponds to a board shown in FIG. 13.

In the example of combination 5, the LED positions are shown in FIG. 13, and the reflector member 120 to which the board 110 is attached is shown in FIG. 14. Here, FIG. 13A is a top plan view of the board 110, and FIG. 13B is a bottom plan view of the board 110.

This example is an example where only one LED light source L on one end side in the vehicle lateral direction is displaced in the vehicle longitudinal direction. In the example shown in FIG. 13, only the LED light sources L3, L6 are arranged on a rear side in the vehicle longitudinal direction with respect to other LED light sources L.

The reflecting portions REF of the reflector member 120 corresponding to the LED light sources L1 to L6 are arranged as shown in FIG. 14, and only the reflecting portions REF3, REF6 are arranged on a rear side in the vehicle longitudinal direction with respect to other reflecting portions REF.

This example is adaptable to a design where one end side of the lens member 170 in the vehicle lateral direction is indented, for example.

Second Embodiment

In the first embodiment, the rear portion of the attaching portion 121 is opened so that the board 110 is detachably attached to the attaching portion 121 from a rear side of the attaching portion 121. However, the reflector 120 may be configured such that a front portion of the attaching portion 121 is opened so that the board 110 is detachably attached to the attaching portion 121 from a front side of the attaching portion 121.

Figure 15:
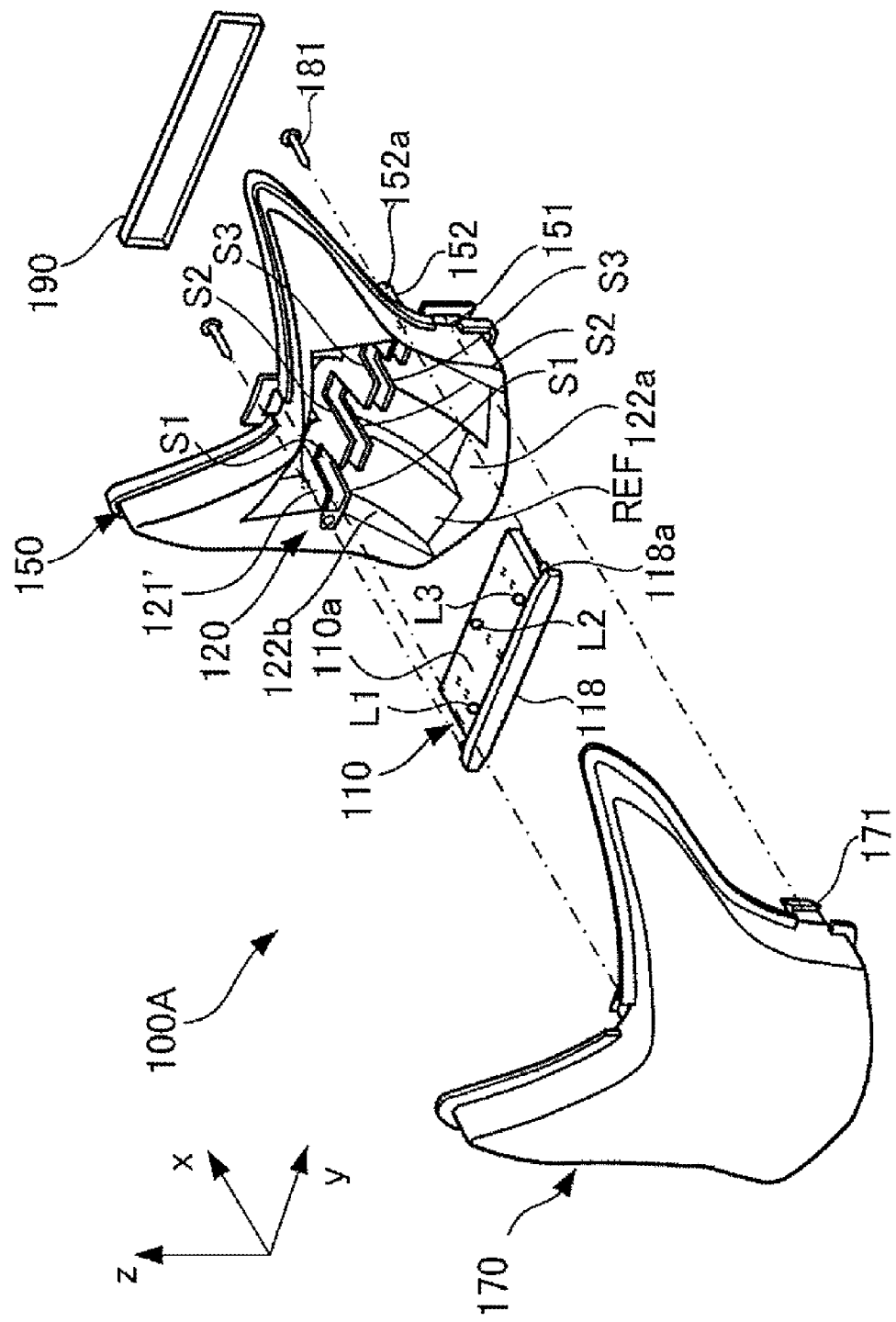
FIG. 15 is an explanatory view of a lamp for a vehicle according to another embodiment of the present invention.

FIG. 15 is an assembly view of a headlight unit 100A which shows a constitutional example where the board 110 is inserted into a housing 150 from a front side of the housing 150. Parts having the same constitution as the first embodiment are given same symbols.

In this embodiment, a front portion of an attaching portion 121' of a reflector member 120 is opened so that an insertion portion is opened, and a rear portion of the attaching portion 121' is closed (not shown in the drawing). Further, different from the first embodiment, opening portions S1 to S3 have a notched shape where a front portion of the opening portion is opened. To compare the constitution of the second embodiment with the constitution of the first embodiment, there may be a case where light emitted from an LED light source L minimally leaks toward a rear side, and is likely to be emitted toward a front side compared with the first embodiment.

Although a mounting member 118 is positioned on a front side of the board 110 in this embodiment, the board 110 of the first embodiment can be used as it is by merely changing the insertion direction of the board 110.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A lamp for a vehicle, comprising: a plurality of LED light sources; a board having a plurality of mounting portions on which said LED light sources are mounted; and a reflector member covering said LED light sources, said reflector member reflecting light emitted from said LED light sources with directivity, wherein said plurality of mounting portions are arranged at least in one direction among the vehicle longitudinal direction and the vehicle lateral direction, such that said LED light sources are mountable can be disposed in plural configurations on said board, wherein a number of said plurality of mounting portions exceeds a number of said plurality of LED light sources, and wherein said reflector member is detachably attached to said board wherein said reflector member includes a reflecting portion which reflects the light emitted from said LED light sources and an attaching portion attached to said board, wherein said attaching portion is attached to said board such that said attaching portion covers a mounting surface of said board on which said LED light sources are mounted, wherein said attaching portion has an opening portion for exposing said LED light sources: and wherein each of said plurality of LED light sources is disposed between said attaching portion and a corresponding reflecting portion.

2. The lamp for a vehicle according to claim 1, wherein said attaching portion includes a first wall portion which covers a front surface of said board, a second wall portion which covers a back surface of said board, and a third wall portion which covers an end surface of said board, and wherein said first, second and third wall portions form an insertion portion into which said board is detachably inserted.

3. The lamp for a vehicle according to claim 1,
wherein said plurality of mounting portions are arranged at least in the vehicle lateral direction,
wherein said LED light sources are mounted on said board in the vehicle lateral direction,
wherein said reflector member is formed of a plurality of reflecting portions corresponding to said LED light sources, said reflecting portions reflecting light emitted from said LED light sources with directivity, and
wherein each of said reflecting portions has a curved surface which surrounds a corresponding one of said LED light sources in the lateral direction.

4. The lamp for a vehicle according to claim 1,
wherein said plurality of mounting portions are arranged in the vehicle longitudinal direction and in the vehicle lateral direction,
wherein said LED light sources are mounted on said board in the vehicle lateral direction,
wherein said reflector member is formed of a plurality of reflecting portions corresponding to said LED light sources, said reflecting portions reflecting light emitted from said LED light sources with directivity,
wherein at least one of said LED light sources is arranged in a displaced manner in the vehicle longitudinal direction, with respect to other of said LED light sources, and
wherein at least one of said reflecting portions is arranged in a displaced manner in the vehicle longitudinal direction, with respect to other of said reflecting portions, corresponding to the arrangement of said LED light sources.

5. The lamp for a vehicle according to claim 1,
wherein said plurality of mounting portions are arranged in the vehicle longitudinal direction and in the vehicle lateral direction,
wherein said LED light sources are mounted on said board in the vehicle lateral direction,
wherein said reflector member is formed of a plurality of reflecting portions corresponding to said LED light sources, said reflecting portions reflecting light emitted from said LED light sources with directivity,
wherein one of said LED light sources at a center in the vehicle lateral direction is arranged in a displaced manner toward one directional side, in the vehicle longitudinal direction, compared to other of said LED light sources on both end sides of said one of said LED light sources, in the vehicle lateral direction, and
wherein one of said reflecting portions at the center in the vehicle lateral direction is arranged in a displaced manner toward one directional side, in the vehicle longitudinal direction, compared to other of said reflecting portions on both end sides in the vehicle lateral direction of said one of said reflecting portions, corresponding to the arrangement of said LED light sources.

6. The lamp for a vehicle according to claim 1, wherein said lamp comprises at least three rows of mounting portions arranged in the vehicle lateral direction, and wherein said lamp comprises at least three columns of mounting portions arranged in a vehicle longitudinal direction.

7. The lamp for a vehicle according to claim 6, wherein said plurality of LED light sources is three LED light sources.

* * * * *